United States Patent

Cole

[15] 3,648,822

[45] Mar. 14, 1972

[54] CONVEYOR FOR WASHING GLASSWARE

[72] Inventor: Manning E. Cole, 72-10 11 2th St., Forest Hills, N.Y. 11375

[22] Filed: Jan. 6, 1970

[21] Appl. No.: 906

[52] U.S. Cl. ........................................... 198/131, 198/181
[51] Int. Cl. .................................................. B65g 17/06
[58] Field of Search .................. 198/131, 181, 189, 135; 134/70, 124

[56] References Cited

UNITED STATES PATENTS

| | | | |
|---|---|---|---|
| 1,707,088 | 3/1929 | Lynch | 198/189 |
| 1,998,757 | 4/1935 | Hauk | 198/135 |
| 581,948 | 5/1897 | Sjostrom | 198/181 X |

*Primary Examiner*—Edward A. Sroka
*Attorney*—Richards & Geier

[57] ABSTRACT

A conveyor for washing, rinsing and/or drying receptacles, particularly glassware for laboratories or manufacturers, comprises an endless horizontal chain provided with radially extending carriers for the glassware. Each carrier has two parallel bars upon which the glassware is mounted. The outer ends of the bars are connected to an elongated bracket. The ends of the bracket located beyond the bars carry two pairs of rollers mounted upon a supporting surface. The inner ends of the bars are connected to a chin link by a holder carrying a raised pair of rollers. The chain is pushed step-wise by reciprocating dogs engaging the raised rollers during their forward movement. An important feature of the present invention is that on both sides of a holder connected with bars there are roller-carrying holders connected with chain links but having no bars. Thus comparatively wide spaces are provided between adjacent pairs of bars which facilitate cleaning, centering and mounting.

3 Claims, 5 Drawing Figures

INVENTOR.
MANNING E. COLE

INVENTOR.
MANNING E. COLE

CONVEYOR FOR WASHING GLASSWARE

This invention relates to a conveyor used for washing, rinsing and/or drying receptacles of any size, type or shape, particularly glass containers, such as laboratory glassware, bottles, pipettes, glass tubes and the like.

Conveyors of this type consist of endless chains provided with horizontal supports for the glassware and moving the glassware individually in and out of engagement with headers, blowers or rinsers which supply the washing or drying fluid.

In prior art devices of this type difficulties were encountered in properly mounting and maintaining the glassware upon the support, particularly when trays are used, in removing any breakage which may occur, in cleaning the device and in providing proper centering of glassware over the jets which treat them.

An object of the present invention is to eliminate the drawbacks of existing devices.

Other objects will become apparent in the course of the following specification.

In the accomplishment of the objectives of the present invention it was found desireable to connect the supports with the chain in such a manner that the individual supports are widely separated one from the other. Preferably each support consists of two parallel bars connected to a single link of the chain. According to the present invention the links located on opposite sides of the support-carrying link are left free, namely, they do not carry any supports. Thus there is always a space left between two adjacent supports which is equal to the length of two links. The chain is operated intermittently by a push type drive.

The use of a push type drive is important since it makes it possible to provide an accurate centering of glassware over the jets. For that purpose the contact points of the push type drive can be machined to tolerances of 0.002 inch. An accurate centering can not be attained by the use of a chain driven by sprockets since the chain soon stretches and causes misalignment over the jets.

However, in the usual push type drive the carriers or supports push one against the other during their movement. According to the present invention, the outer bar is extended and serves the purpose of the missing carriers.

This arrangement makes it possible to mount comparatively wide trays upon the supports. In general, the procedure of attaching glassware to the supports is greatly facilitated. In case of breakage, fragments can be easily and quickly removed without it being necessary to stop the machine. The cleaning of the entire machine is greatly facilitated. The centering of the glassware can be carried out extremely accurately.

The invention will appear more clearly from the following detailed description when taken in connection with the accompanying drawings showing by way of example only, a preferred embodiment of the inventive idea.

Figure 1:
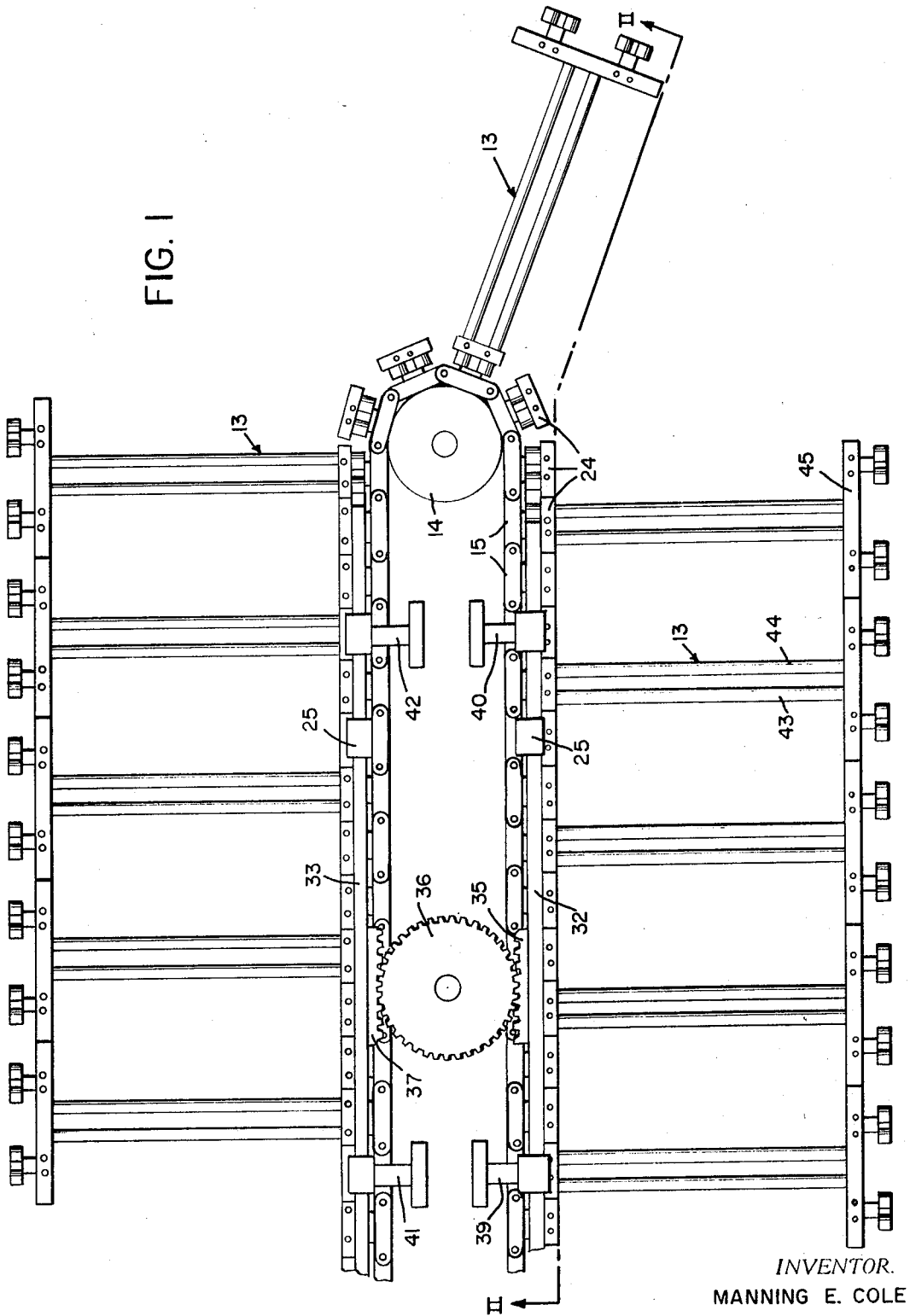
FIG. 1 is a top view of a front portion of a conveyor constructed in accordance with the principles of the present invention.
Figure 2:
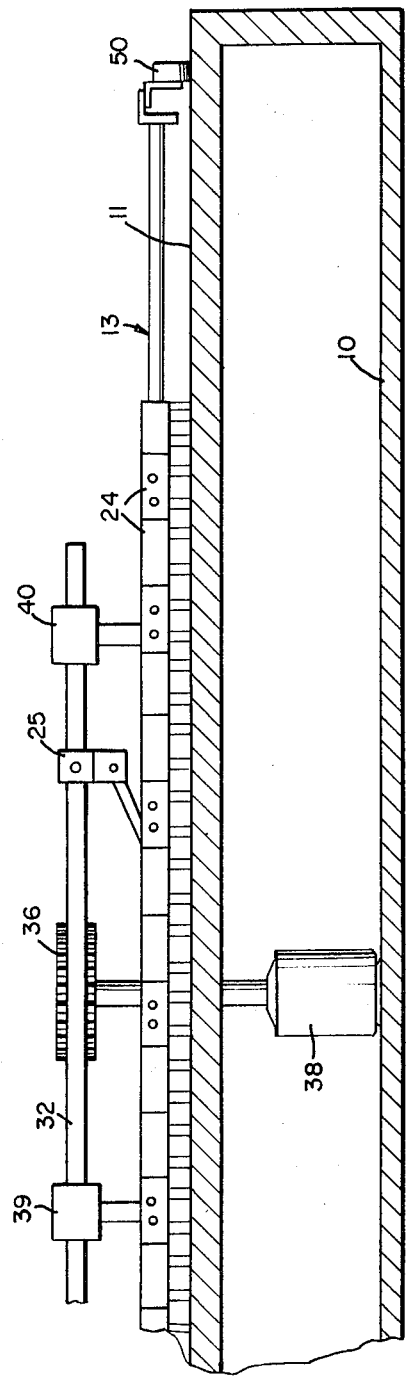
FIG. 2 is a transverse section along the lines II—II of FIG. 1.

The conveyor of the present invention has a casing 10 provided with a supporting surface 11 for the chain 12 moving the glassware. The casing 10 has a front portion which is illustrated in FIGS. 1 and 2 and which is open, so that the user can place glassware upon the carriers 13 moved by the chain or remove the glassware from the chain. The rear portion of the casing which is not shown includes a variety of nozzles and other devices used for washing, rinsing and drying glassware located upon the carriers 13. Since this part of the apparatus is well known in the art and does not constitute a part of the present invention, it is not illustrated in the drawings. The glassware is also not illustrated since it may consist of a variety of receptacles which can be attached to the carriers 13 by wires or any other suitable connecting means (not shown).

The chain 12 moving the glassware is an endless chain extending around a cylindrical front support 14 and a similar rear support (not shown).

Figure 3:
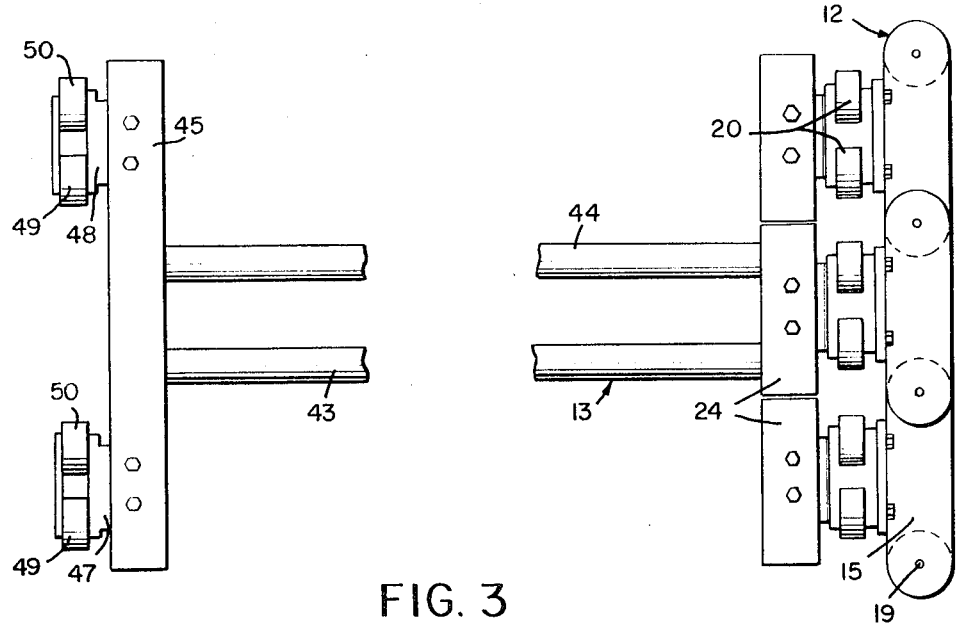
FIG. 3 is a top view of a carrier of the present invention.
Figure 4:
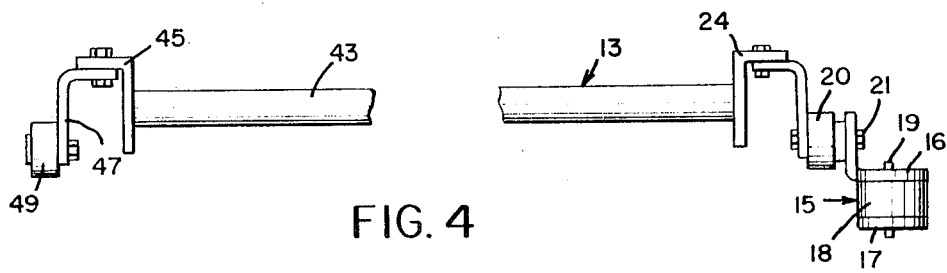
FIG. 4 is a side view of the carrier shown in FIG. 3.

As best shown in FIGS. 3 and 4, the chain 12 consists of links 15. Each link has an upper plate 16 and a lower plate 17. Each link is joined to the next link by a cylindrical member 18. A pin 19 extends through the cylinder 18 and adjacent ends of the two links. Thus there is a swingable connection between the links so that they can readily move around the two supports of the chain.

The device which moves the chain stepwise includes a separate pair of rollers 20 connected with each link 15 by pins 21 mounted in a plate 22. The plate 22 is preferably an integral part of the upper plate 16 of a link and extends at right angles thereto. Opposite ends of pins 21 extend through a vertical portion of an L-shaped plate 23. Thus the rollers 20 are freely rotatable between the plates 22 and 23.

The horizontal portions of the plates 23 extend under horizontal portions of L-shaped plates 24 some of which are connected to the carriers 13, as will be described in detail hereinafter.

Figure 5:
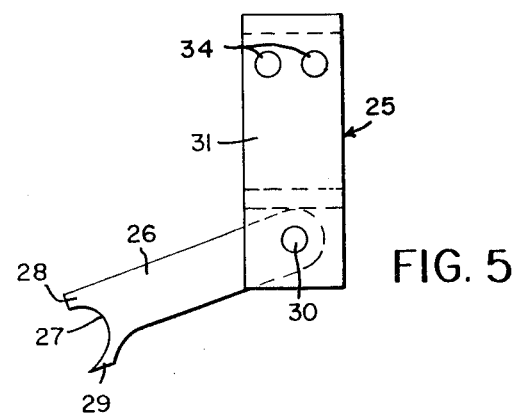
FIG. 5 is a side view of a chain-actuating dog.

The chain 12 is moved stepwise by two reciprocating dogs 25 one of which is shown in FIG. 5. Each dog has a swingable member 26 having a curved portion 27 located between two projections 28 and 29. The swingable member 26 is carried by a pivot 30 mounted in a holder 31. Two bars 32 and 33 extend on opposite sides of the chain 12. The holders 31 are hollow and the bars 32 and 33 extend through them. Screws 34 are used to firmly fix a holder 31 to the bar. As shown in FIG. 1, the bar 32 has a toothed portion 35 meshing with a toothed wheel 36. The bar 33 has a similar toothed portion 37 meshing with the opposite side of the toothed wheel 36. The toothed wheel 36 receives a swinging back-and-forth movement from a motor 38 (FIG. 2). The bar 32 is carried by supports 39 and 40 mounted upon the casing. Similar supports 41 and 42 carry the bar 33.

The dogs 25 are of such size and the bars 32 and 33 are located at such height above the rollers 20 that when a bar is moved in one direction the curved portion 27 of the dog carried by the bar will engage a roller 20 and will push it along with the entire chain connected herewith. When that bar is moved in the opposite direction the projection 29 of the dog will slide over the rollers 20 so that the chain will not be moved. The two dogs 25 are placed in opposite directions upon the bars 32 and 33 so that they will jointly push the chain 12 in the same direction.

Obviously, the bar supports 39 to 42 can be differently constructed or located, or may be replaced by supporting arms.

As shown in FIGS. 3 and 4, the glassware carriers 13 include two parallel rectangular rods 43 and 44 having inner ends firmly connected to a plate 24. The opposite outer ends of the rods 43 and 44 are firmly connected to a vertical portion of an elongated L-shaped plate 45. The horizontal portion of the plate 45 is connected adjacent its two opposed ends by screws 46 with horizontal portions of two plates 47 and 48, each serving as a carrier for rollers 49 and 50.

A most important feature of the present invention consists in that two plates 24 which do not carry the rods 43 and 44, are located on opposite sides of a plate 24 to which the rods 43 and 44 are attached. On the other hand, the plate 45 carrying the opposite ends of the rods 43 and 44 has a length which is close to being the length of three plates 24, namely, the length of the central plate 24 carrying the rods and the two adjacent plates 24 which do not carry the rods. As illustrated in FIG. 1, this arrangement is repeated throughout the entire length of the chain 12.

This construction which provides empty spaces between adjacent pairs of rods 43 and 44 was found to be most effective in actual practice since it provides an easier cleaning of the entire unit, as well as easier maintenance. Larger pieces of glassware or trays carrying several pieces can be placed on one pair of rods 43 and 44 and will not interfere with similar pieces or trays placed on adjacent pairs of rods. The danger of glass breakage due to improper loading is greatly diminished.

In operation, as already described, the movement of the gear wheel 36 will cause a reciprocating movement of the dogs 25 and they will push the chain 12 during their movement in one direction, thereby providing a step by step movement of the chain. The carriers 13 will roll along with the chain upon their rollers 49 and 50. As shown in FIG. 1, the carriers 13 will be widely spaced apart and extend radially adjacent the turning sections of the chain, while they will extend parallel to each other but sufficiently widely apart along the parallel lengths of the chain.

I claim:

1. In a conveyor for washing glassware, an endless chain having a plurality of pivotally interconnected links, means moving said chain stepwise and comprising rollers carried by all of said links and reciprocating dogs, each of said dogs engaging one of said rollers and pushing it along with the entire chain during the forward part of its reciprocating movement, a plurality of glassware carriers, each of said glassware carriers comprising two parallel bars and means rotatably supporting outer ends of said bars, means connecting said glassware carriers to source of said links, other links being devoid of the connection to the carriers, the last-mentioned means connecting inner ends of said bars to a link.

2. A conveyor in accordance with claim 1, wherein the last-mentioned means comprise means connecting a glassware carrier to one link, while two links located on opposite sides of said one link are devoid of this connection 3. A conveyor in accordance with claim 1, wherein the last-mentioned means comprise a plate having the length of substantially three links and carrying the outer ends of the two bars, and rollers connected with and supporting said plate.

* * * * *